Patented Dec. 14, 1937

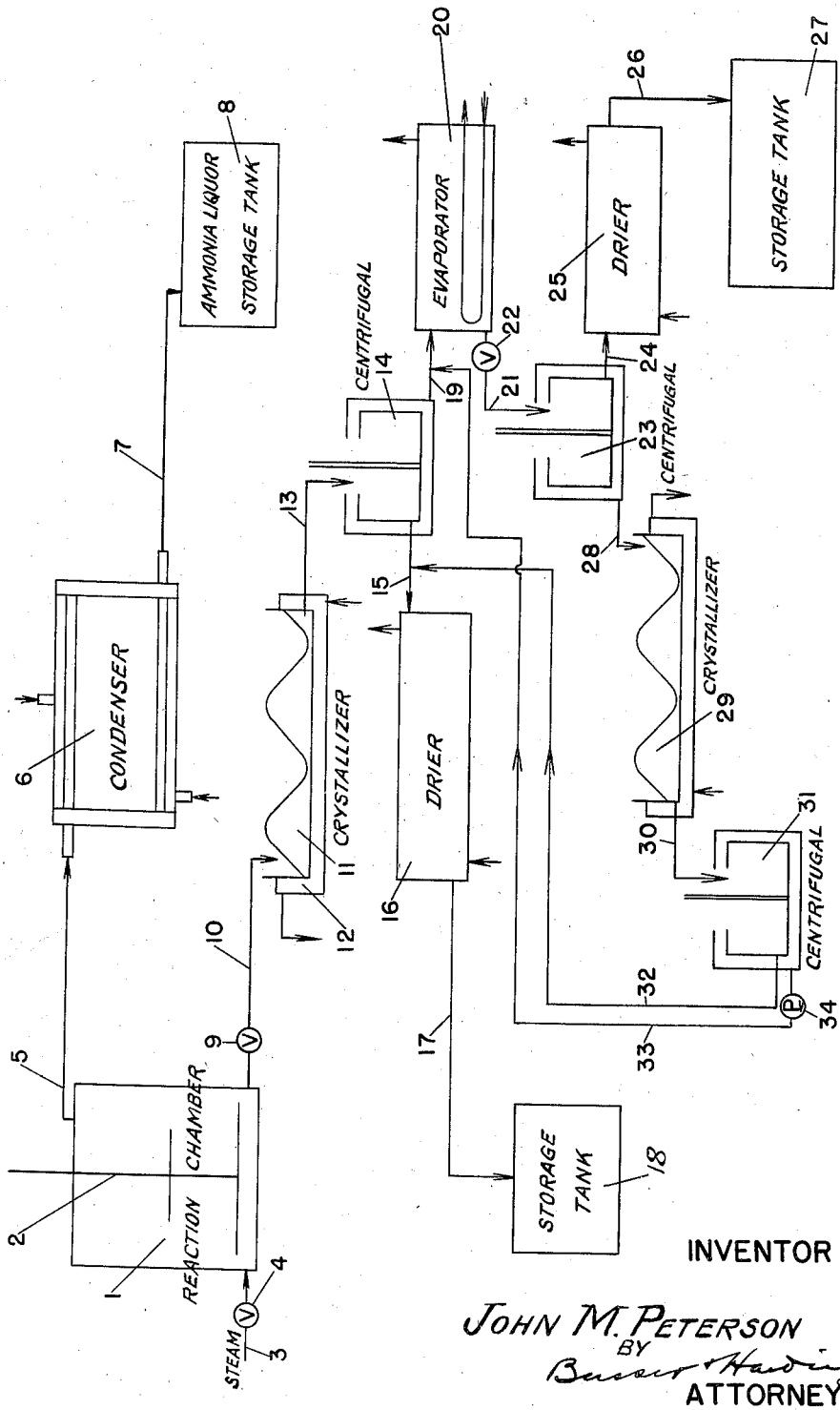

2,102,126

UNITED STATES PATENT OFFICE 2,102,126

METHOD FOR PRODUCING AMMONIA AND BORIC ACID

John Merriam Peterson, Avondale, Pa., assignor to Hercules Powder Company, Wilmington, Del., a corporation of Delaware Application May 5, 1934, Serial No. 724,219

3 Claims. (Cl. 23—149)

This invention relates to a method for producing ammonia and boric acid.

Heretofore, as is well known, ammonia, has been produced by reacting ammonium sulphate with a strong alkali as, for example, lime, with the production of calcium sulphate as a waste product; while boric acid has been produced by reacting borax with an acid as, for example, sulphuric acid, with the production of sodium sulphate.

Now, in accordance with this invention, I have found that ammonia and boric acid can be produced by reacting an inorganic ammonium salt with a borate soluble in a solution of ammonium salts. The reaction may be carried out under any suitable conditions and without necessity for the use of any particular form of apparatus. The ammonia and boric acid produced may be recovered in any convenient manner.

In proceeding in accordance with this invention inorganic ammonium salts such as, for example, ammonium sulphate, ammonium chloride, ammonium nitrate, etc., etc. may be used; while water-soluble borates as, for example, sodium borate (borax), potassium borate, lithium borate, etc., etc. may be used.

The reaction involved in accordance with this invention, using, for example, ammonium sulphate and borax, will be as follows:

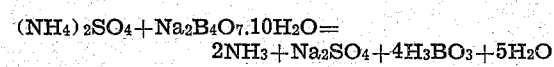

$(NH_4)_2SO_4 + Na_2B_4O_7.10H_2O = 2NH_3 + Na_2SO_4 + 4H_3BO_3 + 5H_2O$ from which it will be noted that in addition to ammonia and boric acid an alkali salt of an inorganic acid, in the above reaction sodium sulphate or salt cake adaptable for use in sulphate pulp plants, is produced.

In practice the inorganic ammonium salt and water soluble borate may be reacted in aqueous solution or in substantially dry state. Generally speaking, heat will desirably be applied to facilitate the reaction and to facilitate recovery of the ammonia produced.

As illustrative of the carrying out of the process in accordance with my invention, reference is made to the accompanying drawing, in which 1 represents a closed tank containing an aqueous solution of ammonium sulphate and borax, agitated by stirring device 2. Steam is admitted to the bottom of tank 1 via pipe 3 and valve 4. From tank 1 pipe 5 leads to condenser 6, wherein the ammonia and water vapor escaping from tank 1 during the reaction are condensed to aqueous ammonia, which latter escapes from condenser 6 via pipe 7 to ammonia liquor storage tank 8.

From the bottom of tank 1 the solution, after completion of the reaction, is passed via valve 9 and pipe 10 into crystallizer 11, cooled by cooling jacket 12. Crystallized boric acid from crystallizer 11 passes via large pipe 13 to centrifugal 14, where the greater part of its moisture content is removed. From centrifugal 14 the centrifuged crystals of boric acid are conveyed via conveyor 15 to drier 16, where the boric acid crystals are dried, finally passing via conveyor 17 to storage tank 18.

The liquid wrung from the wet boric acid crystals in centrifugal 14 passes via pipe 19 to evaporator 20, from which the mixture of solution and crystals, after partial evaporation, passes via pipe 21 and valve 22 to centrifugal 23, where the sodium sulphate is removed as a solid passing via pipe 24 to drier 25, from which the dried sodium sulphate passes via conveyor 26 to storage tank 27.

The liquid separated in centrifugal 23 passes via pipe 28 to crystallizer 29, wherein the boric acid crystallizes out, and from crystallizer 29 the boric acid passes via pipe 30 to centrifugal 31, in which the boric acid is freed from liquid and is passed via conveyor 32 to drier 16, where it joins with the boric acid first produced. The aqueous solution separated in centrifugal 31 passes via pipe 33 and pump 34 to evaporator 20.

As illustrative of a practical adaptation of this invention, for example, an aqueous solution of ammonium sulphate and borax, in the molecular proportions given above and of any desired concentration, are run down an ordinary stripping column or plate column, while admitting steam at the bottom of the column. If desired a vacuum may be maintained on the column. Ammonia will pass in gaseous form from the top of the tower and on cooling to condense moisture may be passed to storage or a place of consumption. The residual solution leaving the bottom of the tower or column and containing sodium sulphate and boric acid is cooled to precipitate a large part of the boric acid, which then may be readily recovered, for example, by filtration or otherwise. It is preferred to discontinue cooling the solution just prior to reaching the point of mutual solubility of boric acid and sodium sulphate to prevent contamination of the former by the latter. The mother liquor is then concentrated in any suitable means, for example, by evaporation at elevated temperature, leaving solid sodium sulphate or salt cake suitable for use in sulphate pulp plants. It is preferred to separate sodium sulphate at an elevated temperature and to discontinue evaporation just prior to reaching the mutual saturation point of sodium sulphate and boric acid to prevent contamination of the former by the latter. This crystallizing cycle of separating boric acid on cooling followed by separating sodium sulphate at higher temperature and evaporation may be repeated with the residual liquor or the liquor may be added back to the cycle with new mother liquor.

As illustrative, for example, 3.9 parts of ammonium sulphate, $(NH_4)_2SO_4$, 11.3 parts sodium borate, $Na_2B_4O_7.10H_2O$, and 5.3 parts water are made to react, yielding approximately 1 part ammonia, $NH_3$. Residue is cooled approximately to 35° C. to precipitate boric acid, $H_3BO_3$, at a yield of approximately 85%. Solution is then heated to about 75° C. and 4.6 parts of water are evaporated to precipitate 2.4 parts sodium sulphate, $Na_2SO_4$ at a yield of approximately 59%. Upon cooling to 35° C. about 0.6 parts of $H_3BO_3$ is again precipitated to bring the total yield to approximately 94%. Residual liquor may be placed back into the system with new liquor following the first precipitation of $H_3BO_3$. This example is given by way of illustrating the process and is not to be understood as limiting the conditions or scope of operation.

As further illustrative of practical adaption of this invention, for example, equivalent quantity of a water-soluble borate and an inorganic ammonium salt are heated in a substantially dry state in a retort. Any suitable temperature may be used since temperature is not the essence of this invention. A temperature of, for example, 100° C. will be desirable. Ammonia will escape from the retort and is collected in any suitable manner, while an alkali salt of an inorganic acid and boric acid will remain in the retort as a residue. Residue is then extracted with a solvent for boric acid, which is a non-solvent for the alkali salt as for example, ethyl alcohol, methyl alcohol, propyl alcohol (commercial grade), or the like. The boric acid is then recovered from the extract in any convenient manner as, for example, by distilling off the solvent.

It will be noted that with use of an excess of borate, say about 10% excess over the ammonia, a higher yield will be readily obtained.

It will be understood that this invention from the broad standpoint involves the production of ammonia and boric acid by reacting a water-soluble borate and an inorganic ammonium salt under any conditions. It will be understood that procedure with the use of a suitable elevated temperature which will facilitate the reaction is desirable, but not essential; and it will be understood that the particular descriptions of practical adaptations of this invention given herein are given by way of illustration and are not contemplated as limiting upon the scope of this invention.

What I claim and desire to protect by Letters Patent is:

1. The method of producing ammonia and boric acid which includes reacting borax and ammonium sulphate in aqueous solution, collecting evolved ammonia and separating boric acid from sodium sulphate produced by alternately cooling and heating the aqueous solution of the two salts and effecting partial evaporation of water during the cycle, whereby boric acid substantially free from sodium sulphate is crystallized from the solution during the cooling step and sodium sulphate substantially free from boric acid is crystallized from the solution during the heating step.

2. The method of producing ammonia and boric acid which includes passing an aqueous solution of borax and ammonium sulphate through a tower, heating the aqueous solution in its passage through the tower, collecting ammonia gas evolved from the tower, cooling the aqueous solution leaving the tower to about 35° C. to crystallize boric acid, recovering the crystallized boric acid, evaporating any water necessary to saturate the solution with sodium sulphate and raising the solution temperature to effect crystallization of sodium sulphate, recovering the crystallized sodium sulphate, cooling the solution again to about 35° C. to crystallize more boric acid, and recovering said crystallized boric acid.

3. The method of producing ammonia and boric acid which includes reacting borax and ammonium sulphate in aqueous solution, collecting evolved ammonia, evaporating any water necessary to saturate the aqueous solution with sodium sulphate and raising the solution temperature to effect crystallization of sodium sulphate substantially free from boric acid, recovering the crystallized sodium sulphate, cooling the aqueous solution to effect crystallization of boric acid substantially free from sodium sulphate and recovering the crystallized boric acid.

JOHN MERRIAM PETERSON.